United States Patent
Li et al.

(10) Patent No.: US 11,098,564 B2
(45) Date of Patent: Aug. 24, 2021

(54) HYDRAULIC FRACTURING USING MULTIPLE FRACTURING FLUIDS SEQUENTIALLY

(71) Applicant: Saudi Arabian Oil Company, Dhahran (SA)

(72) Inventors: Leiming Li, Sugar Land, TX (US); Rajesh Kumar Saini, Cypress, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 15/999,082

(22) Filed: Aug. 17, 2018

(65) Prior Publication Data
US 2020/0056464 A1    Feb. 20, 2020

(51) Int. Cl.
| | |
|---|---|
| *E21B 43/26* | (2006.01) |
| *C09K 8/66* | (2006.01) |
| *C09K 8/74* | (2006.01) |
| *C09K 8/64* | (2006.01) |
| *C09K 8/70* | (2006.01) |

(52) U.S. Cl.
CPC .......... *E21B 43/26* (2013.01); *C09K 8/64* (2013.01); *C09K 8/66* (2013.01); *C09K 8/703* (2013.01); *C09K 8/74* (2013.01); *C09K 2208/14* (2013.01)

(58) Field of Classification Search
None
See application file for complete search history.

(56) References Cited

U.S. PATENT DOCUMENTS

| | | | |
|---|---|---|---|
| 3,316,965 A | 5/1967 | Watanabe | |
| 3,977,472 A | 8/1976 | Graham et al. | |
| 4,718,489 A | 1/1988 | Hallam et al. | |
| 4,887,670 A | 12/1989 | Lord et al. | |
| 5,199,490 A * | 4/1993 | Surles | C09K 8/5086 166/270 |
| 6,776,235 B1 | 8/2004 | England | |
| 6,884,760 B1 | 4/2005 | Brand et al. | |
| 7,326,670 B2 | 2/2008 | DiLullo et al. | |
| 7,527,097 B2 | 5/2009 | Patel | |
| 2004/0211567 A1 | 10/2004 | Aud | |
| 2005/0274523 A1 * | 12/2005 | Brannon | C09K 8/62 166/308.3 |

(Continued)

FOREIGN PATENT DOCUMENTS

| | | |
|---|---|---|
| WO | WO 2012104582 | 8/2012 |
| WO | WO 2015041664 | 3/2015 |

OTHER PUBLICATIONS

Al-Munthasheri, "A Critical Review of Hydraulic Fracturing Fluids over the Last Decade," SPE 169552, presented at the SPE Western North American and Rocky Mountain Joint Regional Meeting, Apr. 16-18, 2014, 25 pages.

(Continued)

*Primary Examiner* — Charles R Nold
(74) *Attorney, Agent, or Firm* — Fish & Richardson P.C.

(57) ABSTRACT

A method for hydraulic fracturing of a subterranean formation includes injecting an oil-based fracturing fluid into the subterranean formation through a well. The method also includes injecting a second fracturing fluid, for example a water-based fracturing fluid, into the subterranean formation through the well after completion of the injection of the oil-based fracturing fluid.

23 Claims, 5 Drawing Sheets

(56) References Cited

U.S. PATENT DOCUMENTS

| | | | |
|---|---|---|---|
| 2009/0253595 A1* | 10/2009 | Qu | C09K 8/04 |
| | | | 507/244 |
| 2014/0090850 A1 | 4/2014 | Benicewicz | |
| 2014/0243246 A1 | 8/2014 | Hendrickson | |
| 2014/0247997 A1* | 9/2014 | Nishiyama | G06K 9/6202 |
| | | | 382/218 |
| 2014/0367100 A1 | 12/2014 | Oliveria et al. | |
| 2016/0137904 A1* | 5/2016 | Drake | C09K 8/536 |
| | | | 507/219 |
| 2016/0215202 A1 | 7/2016 | Weaver et al. | |
| 2017/0066959 A1 | 3/2017 | Hull et al. | |
| 2017/0137703 A1 | 5/2017 | Leverson et al. | |

OTHER PUBLICATIONS

California Council on Science and Technology Lawrence Berkeley National Laboratory Pacific Institute, "Advanced Well Stimulation Technologies in California: An Independent Review of Scientific and Technical Information," CCST, Jul. 2016, 400 pages.

Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.

Montgomery and Smith, "Hydraulic Fracturing: History of Enduring Technology," Journal of Petroleum Technology, Dec. 2010, 7 pages.

Montgomery, "Fracturing Fluids," Chapter 1, Effective and Sustainable Hydraulic Fracturing, Intech, the proceedings of the International Conference for Effective and Sustainable Hydraulic. Fracturing (HF2103) on May 20-22, 2013, 23 pages.

Patel et al., "Analysis of US Hydraulic Fracturing Fluid System and Proppant Trends," SPE 168645, presented at the SPE Hydraulic Fracturing technology Conference, Feb. 4-6, 2014, 20 pages.

Riberio and Sharma, "Fluid Selection for Energized Fracture Treatments," SPE 163867, presented at the SPE Hydraulic Fracturing Technology Conference, Feb. 4-6, 2013, 11 pages.

Soni, "LPG-Based Fracturing: An Alternative Fracturing Technique in Shale Reservoirs," IADC/SPE-170542-MS, IADC/SPE Asia Pacific Drilling Technology Conference, Aug. 25-27, 2014, 7 pages.

Long et al., "Chapter Two: Advanced Well Stimulation Technologies," in an Independent Scientific. Assessment of Well Stimulation in California, vol. I, Well Stimulation Technologies and their Past, Present and Potential Future Use in California, Jan. 2015, 62 pages.

Li et al., "A review of crosslinked fracturing fluids prepared with produced water," Petroleum 2, vol. 2, Issue 4, Dec. 2016, 11 pages.

Barati and Liang, "A Review of Fracturing Fluid Systems Used for Hydraulic Fracturing of Oil and Gas Wells," Journal of Applied Polymer Science, vol. 131, Issue 16, Aug. 15, 2014, 11 pages.

Gandossi and Estorff, "An overview of hydraulic fracturing and other formation stimulation technologies for shale gas production," JRC Science for Policy Report, European Commission, EUR 26347 EN, Jan. 2013, 62 pages.

PCT International Search Report and Written Opinion in International Appln. No. PCT/US2019/046777, dated Oct. 2, 2019, 14 pages.

GCC Examination Report issued in GCC Application No. 2019-38112 dated Sep. 3, 2020, 4 pages.

* cited by examiner

HYDRAULIC FRACTURING USING MULTIPLE FRACTURING FLUIDS SEQUENTIALLY

FIELD OF INVENTION

This disclosure relates to systems and methods for hydraulic fracturing.

BACKGROUND

Hydraulic fracturing is a well stimulation technique in which rock is fractured by a pressurized liquid. The process involves the high-pressure injection of fracturing fluid into a wellbore to create cracks in the deep-rock formations through which natural gas, petroleum, and brine flow more freely.

A hydraulic fracture is formed by pumping fracturing fluid into a wellbore. The rock cracks and the fracture fluid permeates the rock extending the fracture. Operators typically try to maintain "fracture width" by introducing a proppant into the injected fluid. The proppant prevents the fractures from closing when injection stops. The propped fracture is permeable enough to allow the flow of gas, oil, salt water and hydraulic fracturing fluids to the well.

SUMMARY

This disclosure describes a method for using oil-based fluids at the start of fracturing followed by water-based fluids. Additives to the oil-based fluids can be used to change the wettability of a subterranean formation to oil-wet or omniphobic. The oil-wet or omniphobic surface layer can reduce the amount of water absorption by the formation thereby reducing or preventing formation swelling and increases in water saturation. These effects can help the recovery of the fracturing fluid as well as maintenance of reservoir permeability and conductivity. Using this method limits effects on the subterranean formation when switching to the water-based fracturing fluid. The oil-based fluid also behaves as a fluid loss agent and limits or prevents water from getting into the formation solids. Additionally fluid loss agents can also be included in oil-based fluid to prevent minimum imbibition of oil or other fracturing fluid in the formation thereby keeping the water saturation of the formation low. The oil-based fluids and the water-based fluids are pumped through the wellbore and are used to fracture the formation or extend existing fractures.

Some methods and systems of hydraulic fracturing of a subterranean formation include injecting an oil-based fracturing fluid into the subterranean formation through a well. A water-based fracturing fluid is injected into the subterranean formation through the well after completion of the injection of the oil-based fracturing fluid. Most of the oil-based fracturing fluid remains in the subterranean formation when injection of the water-based fluid is complete.

Some methods and systems of hydraulic fracturing of a subterranean formation include injecting an oil-based fracturing fluid into the subterranean formation through a well. A second fracturing fluid is injected into the subterranean formation through the well after completion of the injection of the oil-based fracturing fluid. Most of the oil-based fracturing fluid remains in the subterranean formation when injection of the water-based fluid is complete.

The methods and systems can include one or more of the following features.

In some embodiments, the oil-based fracturing fluid has a single fluid phase during injection. In some cases, the water-based fracturing fluid has a single fluid phase during injection.

In some embodiments, injecting the water-based fracturing fluid into the subterranean formation includes injecting between 0.1-100 times as much of the water-based fracturing fluid into the subterranean formation as the oil-based fracturing fluid injected.

In some embodiments, injecting the water-based fracturing fluid into the subterranean formation includes injecting the water-based fracturing fluid into the subterranean formation during active fracturing of the subterranean formation.

In some embodiments, the oil-based fracturing fluid includes additives. In some cases, the additives include a formation wettability modifier to change wettability of the subterranean formation to hydrophobic or omniphobic. In some cases, the additives include at least one of petroleum sulfonate, fluoropolymer, fluorosurfactants, long chain amines, and long chain quaternary amines that change the wettability of the subterranean formation to oil-wet. In some cases, the additives include fluorosurfactants that limit contact between the subterranean formation and the oil phase of the oil-based fracturing fluid.

In some cases the oil-based fluid may contain fluid loss additives to prevent minimum imbibition of oil or other fracturing fluid in the formation thereby keeping the water saturation of the formation low. These additives include but not limited to wax beads, starch, sodium chloride or salts, polyacrylamide beads, calcium carbonate particles, polylactic acid particles, polyglycolic acid particles, benzoic acid flakes, phthalic acid powder or flakes, polyvinyl alcohol and polyvinylacetate particles, cellulose, HEC or xanthan, AMPS-acrylic acid based polymers, oil soluble resins, etc.

In some embodiments, wherein the oil-based fluid fracturing fluid includes a gelled oil or pure oil fluid phase. In some cases, the oil-based fracturing fluid includes crude oil or diesel.

In some embodiments, the subterranean formation is an unconventional shale formation or a tight gas formation with a permeability of less than about 0.1 millidarcy (mD).

In some embodiments, injecting the second fracturing fluid into the subterranean formation includes injecting between 1 and 100 times as much of the second fracturing fluid into the subterranean formation as the oil-based fracturing fluid injected.

In some embodiments, injecting the second fracturing fluid into the subterranean formation includes injecting the second fracturing fluid into the subterranean formation during active fracturing of the subterranean formation.

In some embodiments, the second fracturing fluid includes at least one of a water-based fracturing fluid, a water-in-oil emulsion, foamed oil, foam, nitrogen, and carbon dioxide.

In this disclosure, "oil-based fluid" indicates a fluid that is at least 75% by volume hydrocarbons and "water-based fluid" indicates a fluid that is at least 75% by volume water. Typically, oil-based fluids are more than 90% by volume hydrocarbons and water-based fluid are more than 90% by volume water.

In this disclosure, "active fracturing" indicates operations in a fracturing process intended to produce or extend fractures in a formation, but does not indicate rather than, for example, flushing fluids from a formation, even if such flushing is described as part of an overall fracturing process.

In this specification, "unconventional formations" indicates low permeability formations (for example, formations with a permeability below about 0.1 mD) where the pores are poorly connected, making it difficult for oil and gas to move through the rock to the wellbore. Oil and gas from unconventional formations (for example, shale gas) are anticipated to be important increasingly energy sources.

The details of one or more embodiments of the systems and methods are set forth in the accompanying drawings and the following description. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

Figure 1:
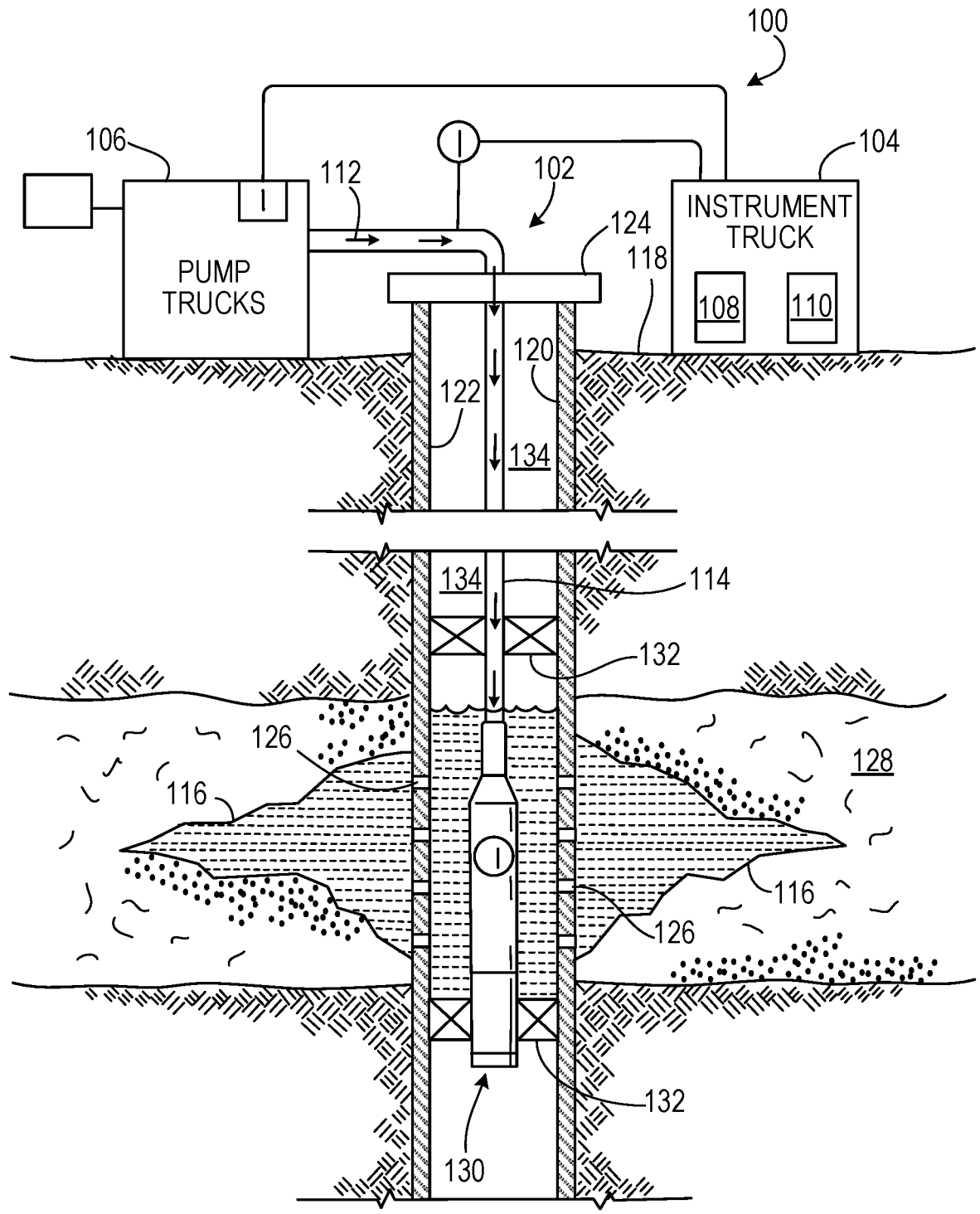
FIG. 1 is an example of a fracture treatment system for a well.

Hydraulic fracturing can increase the hydrocarbon production of low-permeability or damaged reservoirs and wells. In hydraulic fracturing operations, a fracturing fluid is pumped downhole into a wellbore. As the fluid pressure exceeds the fracture pressure, fractures are created where the fracturing fluid is injected. To keep the new fractures open, the fracturing fluids suspend and transport proppant into the fractures where the proppant stays after injection is complete. Depending on the carrier fluid utilized, fracturing fluids can be classified as water-based fluids and oil-based fluids. In most cases, water-based fluids require fresh water as the base fluid. Water can induce issues in water-sensitive formations such as, for example, clay swelling, clay migration, scale formation, and emulsion blockage. Polymer-based aqueous fluids can reduce conductivity and cause damage by depositing a thick polymer filter cake on fracture walls. The interaction between water-based fracturing fluid and water-sensitive formations can dramatically change rock properties and affect the generation of fracture networks.

To mitigate the issues related to the water-based fluids, gelled oil fluids can be used as alternative fracturing fluids that are based on hydrocarbons such as, for example, crude oil, diesel, higher alkanes, vegetable oils, biodiesel, kerosene, hydrotreated mineral oil or mineral oil. Gelled oil fluids may be formulated in the field directly with the local crude oil. Gelled oil fluids also can eliminate the need for the fluid additives used in the water-based fluids such as, for example, clay stabilizers, biocides, and corrosion inhibitors. Unlike the high molecular weight polymers used as gelling agents in many water-based fracturing fluids, gelled oil fluids typically use low molecular weight gelling agents such as alkyl phosphate esters. The alkyl phosphate esters by themselves do not increase the viscosity of hydrocarbons like crude oil or diesel. Instead, gelation of hydrocarbons is realized through the reactions between the phosphate esters and selected metal crosslinkers.

In current oilfield operations, aluminum- and iron-phosphate ester chemistries are generally used to form the gelled oil fluids used for hydraulic fracturing. Gelled oil fluids typically use alkyl phosphate esters as the gelling agent, and iron compounds or aluminum compounds as the crosslinker. The interactions between the metal (aluminum or iron) complexes and phosphate esters can produce long polymer-like chains. These long chains can further entangle with each other to form three-dimensional networks that limit the mobility of the hydrocarbon (oil) molecules in the fluid. The associated fluid viscosity results in the gelled hydrocarbon fluids that can carry and transport proppant.

The price per volume of oil-based fracturing fluids is higher than that of water-based fluids. To mitigate the fluid cost issue and simultaneously prevent formation swelling, the fracturing can be carried out in multiple steps. For example, an oil-based fluid can be pumped first and followed by a water-based fluid. The oil-based fluid pumped creates and fills fractures in the formation. A water-based fluid pumped following the oil-based fluid can further enlarge the fractures and push the oil-based fluid toward the fracture tip. The fracture radius decreases and the capillary force increases along the fracture towards its tip. If the part of the fracture near the tip is occupied by the oil-based fluid, it is easier for oil to flow through because oil fluids are usually miscible with each other. On the contrary, if the fracture near the tip is occupied by water, it is more difficult for oil to flow through as oil and water are immiscible and there is an interface between the oil and water that discourages the flowing or mixing. The water-based fluid occupies the part of the fracture with larger radius. Larger radius can be translated into lower capillary force. This makes it easier for oil to flow through because as the resistance is smaller.

In some approaches, the oil-based fluids can be used without gelation. Depending on the formation permeability and viscosity of the oil, the oil can behave as a fluid loss agent for the water-based fluid that is subsequently pumped after the oil-based fluid and prevent the water from entering into the formation solids. This oil-based fluid can be any hydrocarbon-based fluid or ester-based fluid.

The oil-based fluid may not be able to change the wettability of the formation by itself. If the oil-based fluid is displaced when the water-based fluid flows into the fracture, the water can still swell the formation. Some hydraulic fracturing methods and systems use selected additives in oil phase to change the wettability of the formation to oil-wet or make it omniphobic. For example, long chain amines can be used to make silica surfaces oil-wet so that the water-based fluid cannot swell the formation. Carbonate formations and clay formations can be made oil-wet in similar fashion. Other long chain alkyl surfactants with different headgroups also can be used to make sand, carbonate or clay material oil-wet. In some cases, mixtures of surfactants can be used to form a wettability coating on all the mineral types in a formation. Additionally, utilizing fluorosurfactants can prevent water from coming in contact with formation such that the formations would be affected to lesser extent by water-based fracturing fluid. In this approach, surfactants are added to the oil-based fracturing fluid to prevent or reduce interactions between the later introduced water-based fluid and the formation. Adding the surfactants to oil-based fluids that coat the formation is anticipated to require less surfactants than water-based hydraulic fracturing methods in which the surfactants are added to the water-based fracturing fluid.

In some instances, the surfactant or additives used to change wettability may degrade leaving the formation wettability in its natural state for the production of oil. These surfactants may have a hydrolysable group between the head group and the tail that can be degraded to kill the surfactant activity. In other instances, the wettability may be maintained for efficient production.

Adsorption of surfactants on solid can lead to changes in a variety of interfacial phenomena such as wetting behavior (for example, oil displacement, flotation, detergency) and colloid stability (for example, dispersion, flocculation). There are a number of mechanisms for adsorption such as electrostatic attraction/repulsion, ion exchange, chemisorption, chain-chain interactions, hydrogen bonding and hydrophobic bonding. The nature of the surfactants, minerals and solution conditions as well as the mineralogical composition of reservoir rocks play a governing role in determining the interactions between the reservoir minerals and externally added reagents (surfactants/polymers) and their effect on solid-liquid interfacial properties such as surface charge and wettability.

The wettability changing additives used in these methods and systems include but not limited to cationic, anionic, nonionic and zwitterionic surfactants, oligomers, polymers or mixtures thereof. Fluorosurfactants include but are not limited to fluoro or perfluoro alkylamine oxide, fluoro or perfluoro alkyl ammonium, fluoro or perfluoro alkyl sulfonate, perfluoro alkyl betaine, and fluoro alkyl phosphate esters. Nonionic surfactants include but are not limited to alkyl polysaccharides, EO/PO block copolymers, sorbitan esters, sorbitan alkoxylate (sorbitan laureate, sorbitan stearate etc.), and ethoxylated alcohols. Cationic surfactants include but are not limited to alkyl amine salts, quaternary ammonium salts, and olegomeric cationic compounds with alkyl groups. Anionic surfactants include but are not limited to alkylbenzene sulfonates, alkyl naphthalene sulfonates, fatty acid salts of stearic acid, tallow acid, oleic acid, castor oil, alkylarylsulfonate, alkylphosphate, and alkyl sarcosine. Amphoteric surfactants include but are not limited to alkylbetaines, alkyl imidazolinium betaine, and alkyl amine oxides. Polymeric surfactants include but are not limited to sodium arylsulfonate formaldehyde condensate, and polycarboxylate surfactants.

Water-in-oil emulsions with the additives to perform fracturing can also be used to change the wettability of the formation to oil-wet. Additionally, foamed fluid such as, for example, foamed oil or water with the previously mentioned additives may change the wettability of the formation. Alternatively or additionally, $N_2$ or CO2 fluids with the previously mentioned additives, water-based fluids alone, and/or oil-based fluids alone with the previously mentioned additives can adjust the wettability of the formation to oil-wet.

These methods are primarily performed with unconventional shale and tight gas formations, as these formations have low fluid loss. The oil-based fluid can plug the pores or form a layer on the surface of the fracture to limit or prevent the formation fluid from imbibing water-based fracturing fluid.

In some cases the oil based fluid may contain fluid loss additives to prevent minimum imbibition of oil or other fracturing fluid in the formation thereby keeping the water saturation of the formation low. These additives include but not limited to wax beads, starch, sodium chloride or salts, polyacrylamide beads, calcium carbonate particles, polylactic acid particles, polyglycolic acid particles, benzoic acid flakes, phthalic acid powder or flakes, polyvinyl alcohol and polyvinylacetate particles, cellulose, HEC or xanthan, AMPS-acrylic acid based polymers, oil soluble resins, etc.

FIG. 1 shows an example of a fracture treatment system 100 that includes a well 102, an instrument truck 104, and a pump truck 106. The instrument truck 104 includes a fracture control system 108 operable to control the pump truck 106 and fluid valves (not shown) to stop and start the fracture treatment. The fracture control system 108 is further operable to control the fluid valves to stop and start the fracture treatment. The fracture control system 108 communicates with surface and/or subsurface instruments to monitor and control fracturing. In addition to the fracture control system 108, the instrument truck 104 also includes a fracture simulator 110.

The pump truck 106 pumps fracture fluid 112 down a work string 114 to perform fracture treatment and generate a fracture 116. The fracture fluid 112 can include proppant and/or a flush fluid. The pump truck 106 may include mobile vehicles, equipment such as skids or other suitable structures.

The well 102 includes a well bore 120, a casing 122, and a well head 124. The well bore 120 can be a vertical or deviated bore. The casing 122 can be cemented or otherwise suitably secured in the well bore 120. In some systems, all or a portion of the wellbore is uncased. Perforations 126 formed in the casing 122 at the level of a subterranean formation 128 allow oil, gas, and by-products to flow into the well 102. The oil, gas, and by-product are then transported the surface 118. The perforations 126 can be formed using, for example, shaped charges or a perforating gun.

During fracturing, the work string 114 is disposed in the well bore 120. The work string 114 can be coiled tubing, sectioned pipe or other suitable tubing. A fracturing tool 130 can be coupled to an end of the work string 114. Packers 132 can seal an annulus 134 of the well bore 120 above and below the subterranean formation 128. Packers 132 can be mechanical, fluid inflatable or other suitable packers.

The pump truck 106 first pumps an oil-based fluid through the work string 114 and into the well 102 to generate a fracture 116. One or more pump trucks 106 can be coupled to the work string 114 at the surface 118. The pumping rates may range, for example, from 60-120 barrels per minute. The surface of the fracture 116 is coated by the oil-based fluid and interacts with additives within the oil-based fluid. The pump truck 106 then pumps water-based fracturing fluid through the work string 114 and into the well 102. The water-based fracturing fluid pushes the oil-based fluid further into the fracture 116. The oil-based fluid and the additives coating the fracture 116 can reduce or prevent interactions between the water-based fluid and solids of the subterranean formation, thus limiting swelling of the subterranean formation.

Figure 2:
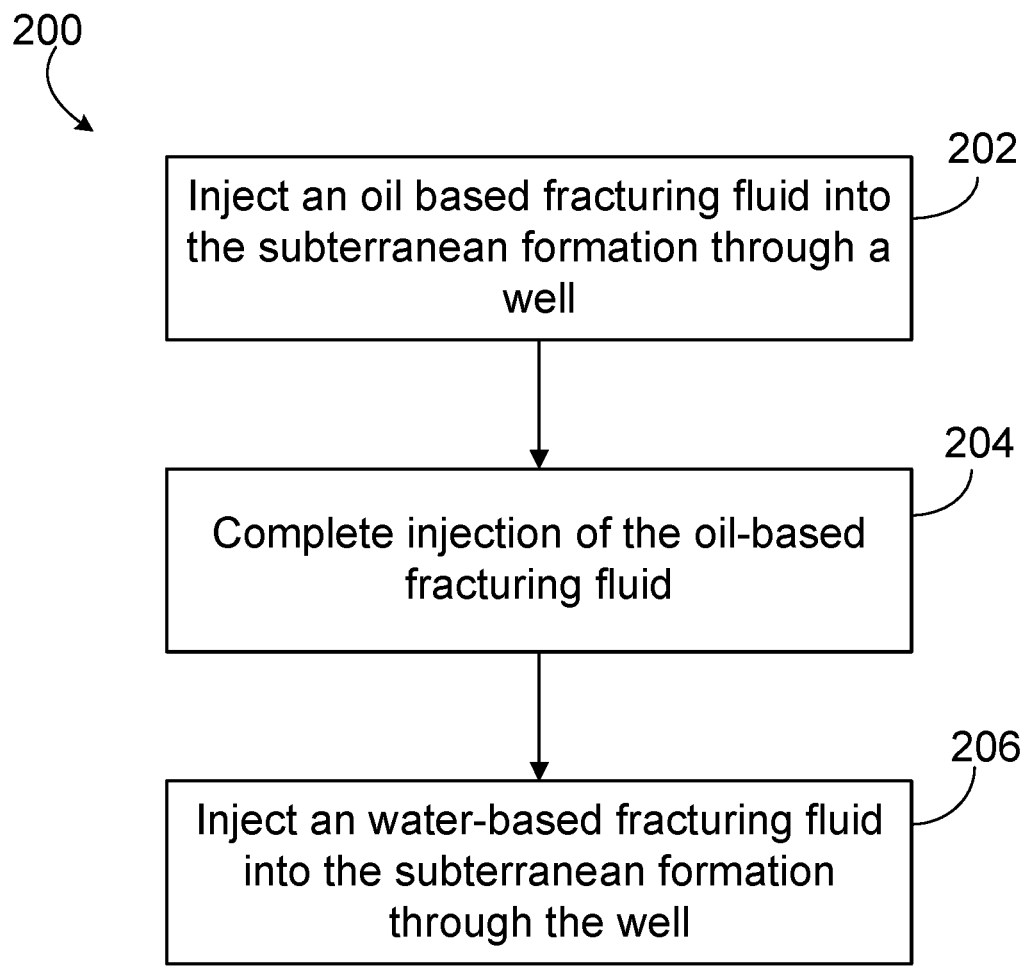
FIG. 2 shows a method of hydraulic fracturing using oil-based and water-based fracturing fluid.

FIG. 2 shows a method 200 of hydraulic fracturing of the subterranean formation 128 through well 102. The method 200 is described with reference to the system components defined in FIG. 1. In the method 200, an oil-based fracturing fluid is injected into the subterranean formation 128 through the well 102 (step 202). In some methods, the oil-based fracturing fluid has a single fluid phase during injection. The single fluid phase is simpler to prepare, to execute and generates less friction when pumped through the work string 114 than invert emulsions. However, both single phase and invert emulsion oil-based fracturing fluids can be used with these systems and methods. After injection of the oil-based fracturing fluid (step 204) is completed, a water-based fracturing fluid is injected into the subterranean formation 128 through the well 102 (step 206). In some methods, the pump truck 106 injects the water-based fracturing fluid in a single fluid phase. Injecting the water-based fracturing fluid into the subterranean formation 128 (step 206) includes injecting at least 0.1-100 times (for example, 1-10 times) as much of the water-based fracturing fluid into the subterranean formation 128 as the volume of the oil-based fracturing fluid injected. Injecting the water-based fracturing fluid into the subterranean formation 128 may include injecting the water-based fracturing fluid into the subterranean formation 128 during active fracturing of the subterranean formation. Injecting a water-based fracturing fluid into the subterranean formation 128 (step 206) starts after the injection of oil-based fluid is complete. The volumes of the oil-based fluid and water-based fluid are determined before the injection. The volume of oil-based fluid injected is determined based on the volume of oil-based fluid necessary to coat the fractured face and the natural fractures in the formation. For example, the volume of oil-based fluid can be estimated by first measuring the pore volume (PV) of the rock sample. This amount is typically a fraction (for example, 1/5, 1/10, 1/15, 1/20 or 1/25) of the amount of total fluid (oil-based and water-based fluids) to be pumped in a given fracturing stage.

The oil-based fracturing fluid may include additives (for example, the previously mentioned additives) that change the wettability of the subterranean formation 128 to oil-wet to limit contact between the subterranean formation 128 and the oil phase of the oil-based fracturing fluid. For example, the method 200 can use fluorosurfactants in the oil-based fracturing fluid. Once adsorbed on the subterranean formation 128, the fluorosurfactants prevent the water-based fluid from interacting with subterranean formation 128. The oil-based fracturing fluid may include a gelled oil or pure oil fluid phase. In some situations, the oil-based fracturing fluid may include crude oil or diesel. This approach is useful when the subterranean formation 128 is an unconventional shale formation or a tight gas formation. Gelled oil fluids based on metal-cross-linked phosphate esters do not contain high molecular weight molecules, thus reducing the damage to unconventional shale rocks.

For formations comprising a large amount of silica, surfactants or materials that bind to the silica to change wettability such as, for example, amine, ammonium, zwitterionic, can be mixed with the oil-based fluid and similar wettability altering materials. Some of the surfactants or materials that bind to the silica, can also or alternatively be added to the water phase. For carbonate-based formations, the wettability alteration materials or surfactants can include groups such as phosphate, phosphonates, carboxylic acid, and fluoro- or perfluoro-chains attached to these wettability altering surfactant or agents.

In contrast to systems and methods that use water-based fluids to flush oil-based fracturing fluids out of a formation after fracturing, these systems and methods follow the oil-based fracturing fluid with a second fracturing fluid but maintain the oil-based fracturing fluid in the formation. This second fracturing fluid may be water-based or other types of fluids such as, for example, methanol-based fluids, foamed water-based fluids, CO2-based fluids, or mixtures of these fluids. The fluids can be linear polysaccharide fluids like guar or derivatized guar based based fluid, cellulose based fluids, water-soluble synthetic polymer based fluids (e.g. slic water fluid), borate or metal crosslinked guar or derivatized based fluids, foam fluids, linear fluids of polysaccharides such as guar, derivatized guar, derivatized cellulose. The fluid can also be an acid based fluid such as 15% HCl, viscosified acid, VES fluid.

Water-based fluids can be prepared in water or brine.

The fluids can include, for example, a gelling agent, friction reducers, crosslinkers, buffers, breakers, proppant, pH control, surfactants, flowback enhancers, scale inhibitor, corrosion inhibitors. The proppant can include, for example, sand, treated sand or man-made ceramic materials.

Figure 3A:
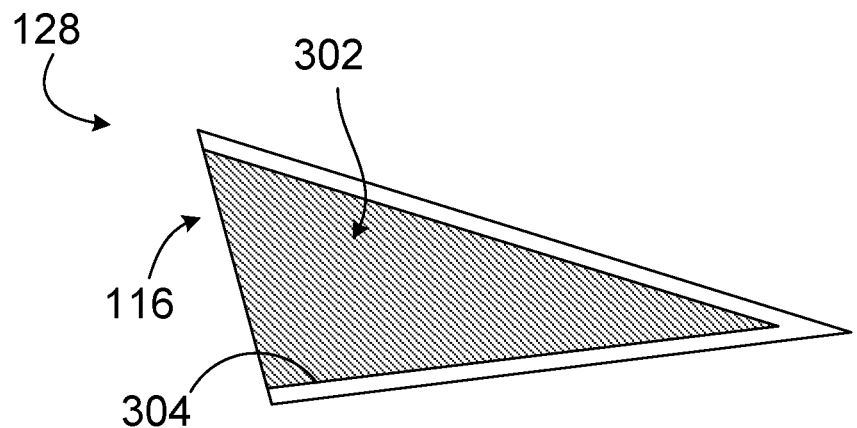
FIG. 3A shows a fracture created and filled by an oil-based fracturing fluid.

FIG. 3A illustrates an oil-based fluid 302 that creates and fills the fracture 116 in the subterranean formation 128. As fracturing occurs, the oil-based fluid 302 coats the subterranean formation. The oil-based fluid 302 creates a layer on fracture face 304. The thickness of the layer depends on the viscosity of the oil-based fluid 302. For some embodiments, the layer is anticipated to be less than 1 millimeter in thickness. In tight, unconventional, gas formations, the oil-based fluid 302 can act as fluid loss agent that limits the loss of water from the water-based fluid to the subterranean formation 128. The oil-based fluid may include diesel, known to be a good fluid loss agent.

Figure 3B:
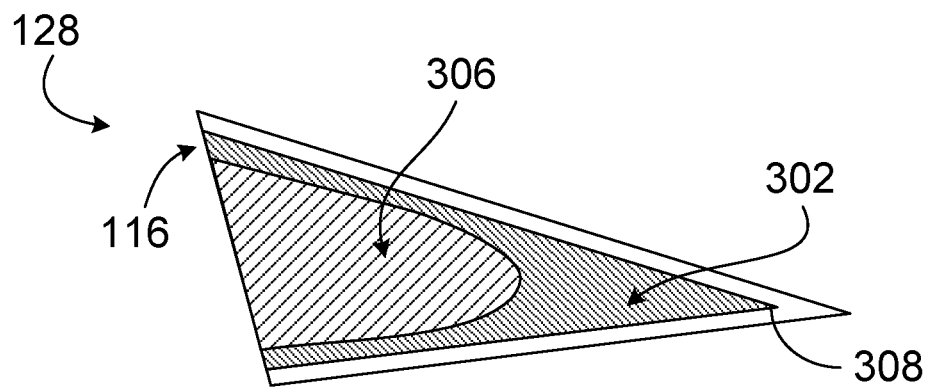
FIG. 3B shows the fracture after the injection of a water-based fluid.

FIG. 3B shows the same fracture after a water-based fluid 306 is pumped though the work string 114 after injection of the oil-based fluid 302. The water-based fluid 306 enters the fracture 116. The fracture 116 may be further extended when the water-based fluid 306 is pumped into the fracture 116. The water-based fluid 306 pushes the oil-based fluid 302 toward a tip 308 of the fracture 116. The tip 308 has smaller radius in relation to the fracture 116 and thus has a larger capillary force. The gas/oil from the subterranean formation flows out more easily when the tip 308 is filled or coated by the oil-based fluid 302, than when the tip is filled or coated by a water-based fluid 306. The water-based fluid 306 occupies the part of the fracture 116 with a larger radius, and therefore has a lower capillary force than the tip 308. It is easier for gas/oil to flow through the larger section, primarily filled by water-based fluid 306, due to the lessening of the capillary forces.

Figure 4:
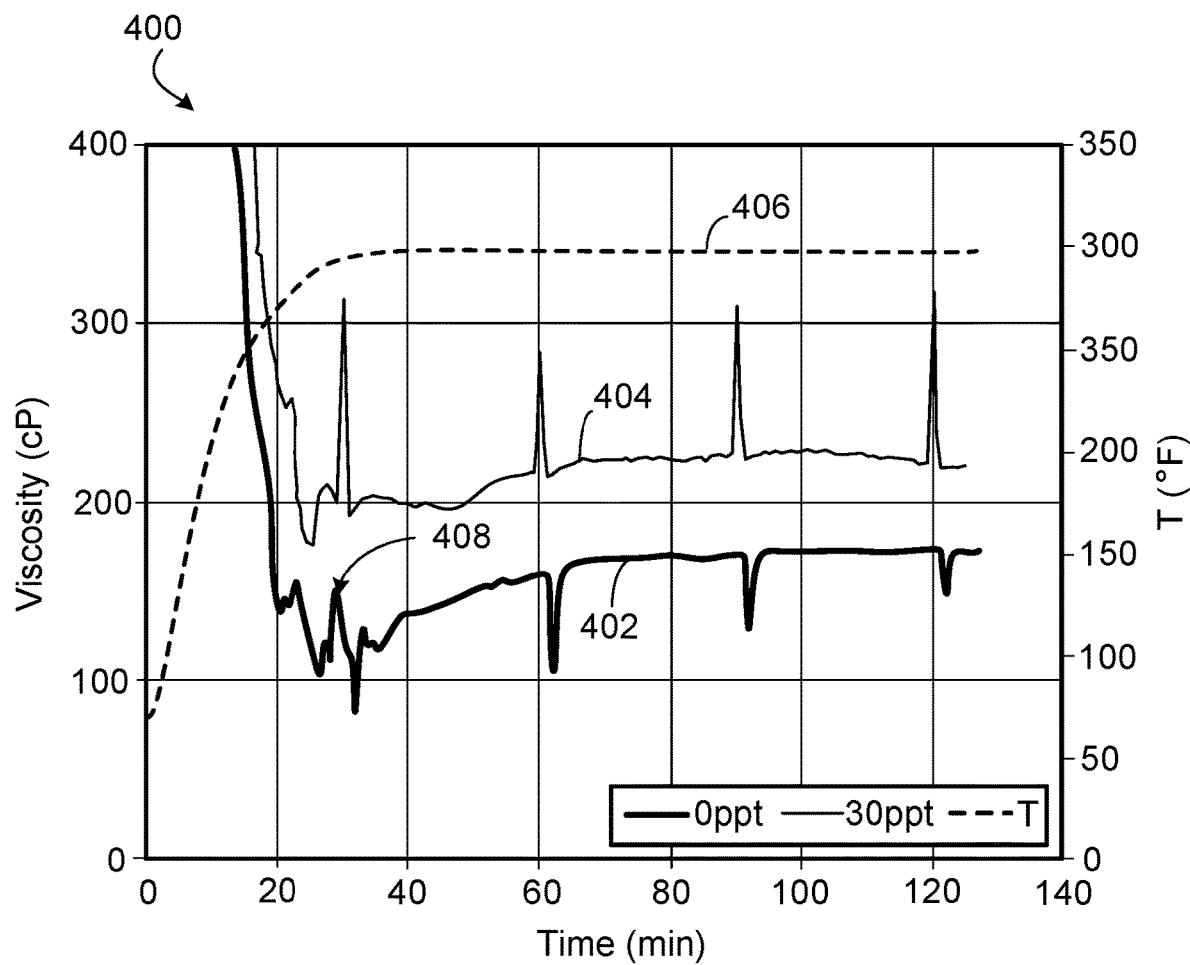
FIG. 4 shows the viscosity at 300° F. for a gelled diesel fracture fluid containing 0 pound per thousand gallons (ppt) and 30 ppt of the enhancing additive.

FIG. 4 shows a graph 400 comparing the viscosities of gelled diesel fracturing fluid containing 0 pound per thousand gallons (ppt) and 30 ppt of the enhancing additive, at 300° F. The baseline gelled oil fluid 402 was prepared with the diesel (bought from a local Shell gas station), 20 gallons per thousand gallons (gpt) of EG-2, a phosphate ester gelling agent commercially available from Ethox Chemicals, and 20 gpt of EA-3, an iron-based crosslinker commercially available from or Ethox Chemicals. The baseline gelled oil fluid 402 contained none (0 ppt) of the additive. A second gelled oil fluid 404 was prepared with the diesel, 20 gpt EG-2, 30 ppt of the montmorillonite (MMT; Aluminum Pillared Clay commercially available from Sigma Aldrich) additive, and 20 gpt EA-3. The viscosities at 300° F. of the gelled oil fluids 402, 404 were measured with a Grace M5600 HPHT rheometer equipped with a B5 bob. The temperature is shown as dotted line 406.

A hydrocarbon volume of about 52-500 mL was used for each gelled oil preparation. Hydrocarbon, in the form of diesel, mineral oil, or crude oil, was added to a Waring blender. While blending, the alkyl phosphate ester gelling agent, Ethox's EG-2, was added and mixed for a couple of minutes. The enhancing additive(s) was then be added and mixed for another couple of minutes. The crosslinker, Ethox's EA-3, was added last, and the vortex closing time at RT recorded.

To measure the viscosity of a gelled oil fracturing fluid sample under the conditions designed to simulate those in a high temperature and high pressure subterranean formation, 52 mL of the gelled oil sample was placed into a Fann50- type viscometer such as Grace M5600 HPHT rheometer. Tests were performed at the bottom hole temperature, following the American Petroleum Institute Recommended Practices (APIRP) 39 schedule and under about 400 psi of nitrogen. The API RP 39 schedule consisted of continuous fluid shearing at 100/s shear rate and a series of shearing ramps at 100, 75, 50, 25, 50, 75, and 100/s once the fluid temperature was within 5° F. of the test temperature and occurring periodically for every 30 minutes.

Compared to the baseline gelled oil fluid 402, the viscosity (at 100/s shear rate) of the 30 ppt montmorillonite additive gelled oil fluid 404, averaged after the first ramping peak 408 (at about 35 minutes), was enhanced by about 35%. Thus, the enhancing additive(s) effectively lowered the dosages of the gelling and crosslinking agents.

Figure 5:
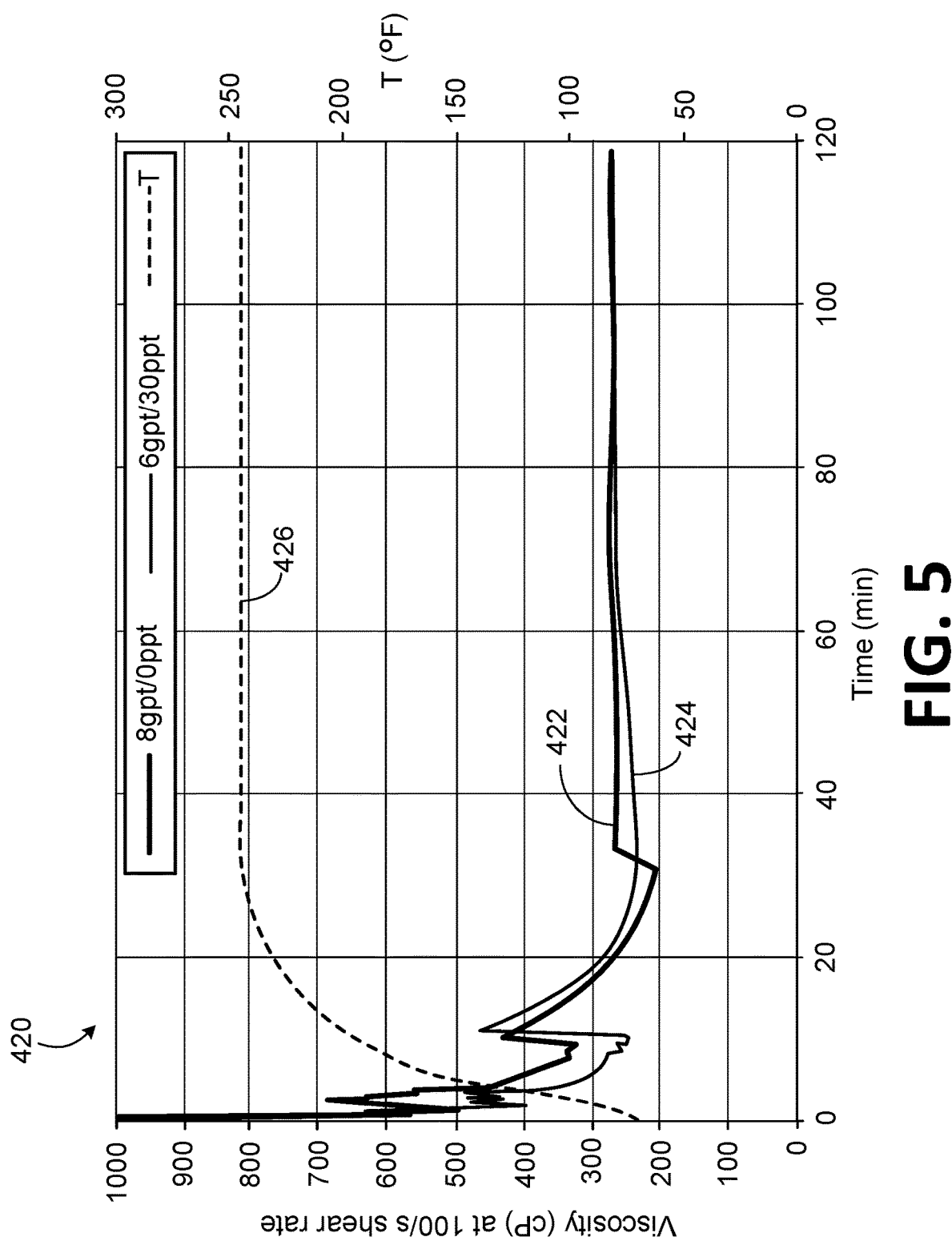
FIG. 5 shows the viscosity at 250° F. for a diesel fracture fluid with different amounts of a gelling agent.

FIG. 5 shows a graph 420 comparing a baseline fluid 422 prepared with diesel, 8 gpt of EG-2, and 6 gpt of EA-3 with a second fluid 424 was prepared with diesel, 6 gpt of EG-2, 30 ppt of montmorillonite additive, and 6 gpt of EA-3. Both fluids were tested at 250° F. (see 426). The viscosity curves of the two fluids were nearly overlapped with each other. This suggests that 30 ppt of montmorillonite additive effectively lowered the EG-2 (gelling agent) dosage from 8 gpt to 6 gpt, an approximately 25% reduction in the gelling agent needed.

A number of embodiments of the invention have been described. Nevertheless, it will be understood that various modifications may be made without departing from the spirit and scope of the disclosure. Accordingly, other embodiments are within the scope of the following claims.

What is claimed is:

1. A method of hydraulic fracturing of a subterranean formation, the method comprising:
   measuring a pore volume of a sample from the subterranean formation, wherein the formation is an unconventional shale formation or a tight gas formation;
   estimating a volume of an oil-based fracturing fluid necessary to coat a fractured face in the subterranean formation based on the measured pore volume of the sample;
   injecting the estimated volume of the oil-based fracturing fluid into the subterranean formation through a well prior to active fracturing; and
   injecting a water-based fracturing fluid into the subterranean formation through the well during active fracturing after completion of the injection of the oil-based fracturing fluid
   wherein an amount of the oil-based fracturing fluid is between 1/5 and 1/25 of a total amount of the oil-based fracturing fluid and the water-based fracturing fluid pumped during a given fracturing stage.

2. The method of claim 1, wherein the oil-based fracturing fluid has a single fluid phase during injection.

3. The method of claim 2, wherein the water-based fracturing fluid has a single fluid phase during injection.

4. The method of claim 1, wherein injecting the water-based fracturing fluid into the subterranean formation comprises injecting between 0.1-100 times as much of the water-based fracturing fluid into the subterranean formation as the oil-based fracturing fluid injected.

5. The method of claim 1, wherein injecting the water-based fracturing fluid into the subterranean formation comprises injecting the water-based fracturing fluid into the subterranean formation during active fracturing of the subterranean formation.

6. The method of claim 1, wherein the oil-based fracturing fluid comprises additives.

7. The method of claim 6, wherein the additives comprise a formation wettability modifier to change wettability of the subterranean formation to hydrophobic or omniphobic.

8. The method of claim 7, wherein the additives comprise at least one of petroleum sulfonate, fluoropolymer, fluoroquaternary ammonium, long chain amines, and long chain quaternary amines that change the wettability of the subterranean formation to oil-wet.

9. The method of claim 6, wherein the additives comprise a fluid-loss additive for leakoff control.

10. The method of claim 8, wherein the fluid-loss additive comprises at least one of the group consisting of wax beads, starch, sodium chloride or salts, polyacrylamide beads, calcium carbonate particles, polylactic acid particles, polyglycolic acid particles, benzoic acid flakes, phthalic acid powder or flakes, polyvinyl alcohol particles, polyvinylacetate particles, cellulose, HEC, xanthan, AMPS-acrylic acid-based polymers, and oil soluble resins.

11. The method of claim 7, wherein the additives comprise fluorosurfactants that limit contact between the subterranean formation and the oil phase of the oil-based fracturing fluid.

12. The method of claim 1, wherein the oil-based fracturing fluid comprises a gelled oil or pure oil fluid phase.

13. The method of claim 12, wherein the oil-based fracturing fluid comprises crude oil, diesel, mineral oil or biodiesel.

14. The method of claim 1, wherein the subterranean formation is an unconventional shale formation or a tight gas formation with a permeability of less than about 0.1 millidarcy.

15. A method of hydraulic fracturing of a subterranean formation, the method comprising:
   measuring a pore volume of a sample from the subterranean formation, wherein the formation is an unconventional shale formation or a tight gas formation;
   estimating a volume of an oil-based fracturing fluid necessary to completely coat a fractured face in the subterranean formation based on the measured pore volume of the sample;
   injecting the estimated volume of the oil-based fracturing fluid into the subterranean formation through a well prior to active fracturing; and
   injecting a second fracturing fluid into the subterranean formation through the well after completion of the injection of the oil-based fracturing fluid during active fracturing;
   wherein an amount of the oil-based fracturing fluid is between 1/5 and 1/25 of a total amount of the oil-based fracturing fluid and the water-based fracturing fluid pumped during a given fracturing stage.

16. The method of claim 15, wherein the oil-based fracturing fluid has a single fluid phase during injection.

17. The method of claim 15, wherein injecting the second fracturing fluid into the subterranean formation comprises injecting between 1 and 100 times as much of the second fracturing fluid into the subterranean formation as the oil-based fracturing fluid injected.

18. The method of claim 15, wherein injecting the second fracturing fluid into the subterranean formation comprises injecting the second fracturing fluid into the subterranean formation during active fracturing of the subterranean formation.

19. The method of claim 15, wherein the oil-based fracturing fluid comprises additives.

20. The method of claim 19, wherein the additives comprise at least one of petroleum sulfonate, fluoropolymer, fluoroquaternary ammonium, long chain amines, and long chain quaternary amines that change the wettability of the subterranean formation to oil-wet.

21. The method of claim 19, wherein the additives comprise fluorosurfactants that limit contact between the subterranean formation and the oil phase of the oil-based fracturing fluid.

22. The method of claim 15, wherein the oil-based fracturing fluid fracturing fluid comprises a gelled oil or pure oil fluid phase.

23. The method of claim 15, wherein the second fracturing fluid comprises at least one of a water-based fracturing fluid, a water-in-oil emulsion, foamed oil, foam, nitrogen, and carbon dioxide.

\* \* \* \* \*